US008737785B2

(12) United States Patent
Kuo et al.

(10) Patent No.: US 8,737,785 B2
(45) Date of Patent: May 27, 2014

(54) OPTICAL BEAM COUPLERS AND SPLITTERS

(71) Applicant: Hewlett-Packard Development Company, L.P., Fort Collins, CO (US)

(72) Inventors: Huei Pei Kuo, Cupertino, CA (US); Michael Renne Ty Tan, Menlo Park, CA (US); Shih-Yuan Wang, Palo Alto, CA (US); Robert G. Walmsley, Palo Alto, CA (US); Paul Kessler Rosenberg, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/927,562

(22) Filed: Jun. 26, 2013

(65) Prior Publication Data

US 2013/0287337 A1    Oct. 31, 2013

Related U.S. Application Data

(62) Division of application No. 13/126,845, filed on Apr. 29, 2011, now Pat. No. 8,542,961.

(51) Int. Cl.
  *G02B 6/26* (2006.01)
  *G02B 6/42* (2006.01)

(52) U.S. Cl.
  USPC .................................. 385/50; 385/32; 385/44

(58) Field of Classification Search
  USPC .......................................... 385/32, 43–45, 50
  See application file for complete search history.

(56) References Cited

U.S. PATENT DOCUMENTS

| | | | |
|---|---|---|---|
| 3,874,779 A * | 4/1975 | Thiel | 385/44 |
| 4,176,908 A | 12/1979 | Wagner | |
| 4,306,765 A | 12/1981 | Winzer et al. | |
| 4,339,290 A * | 7/1982 | Winzer et al. | 156/159 |
| 4,708,423 A | 11/1987 | Erman et al. | |
| 4,789,214 A | 12/1988 | Vilhelmsson et al. | |
| 4,888,785 A | 12/1989 | Lee | |
| 5,119,448 A | 6/1992 | Schaefer et al. | |
| 5,239,600 A | 8/1993 | Handa et al. | |

(Continued)

FOREIGN PATENT DOCUMENTS

| | | |
|---|---|---|
| EP | 0309102 | 3/1989 |
| EP | 1847861 | 10/2007 |

(Continued)

OTHER PUBLICATIONS

European Search Report (extended), European Application No. 08877890.7. Report dated Jan. 10, 2013.

*Primary Examiner* — Daniel Petkovsek (57) ABSTRACT

Beam couplers and splitters are disclosed herein. An example of a beam coupler and splitter includes a first waveguide having a first waveguide bevel and a bend, the first waveguide bevel to totally internally reflect at least some light incident thereon. A second waveguide includes a second waveguide bevel complementarily shaped to the first waveguide bevel, the second waveguide being coupled to the first waveguide such that i) the first waveguide bevel is offset from the second waveguide bevel so that a first portion of the first waveguide bevel is in direct contact with a first portion of the second waveguide bevel, a second portion of the first waveguide bevel is exposed, and a second portion of the second waveguide bevel is exposed, and ii) a predetermined coupling ratio is achieved.

7 Claims, 5 Drawing Sheets

(56) References Cited

U.S. PATENT DOCUMENTS

| | | | |
|---|---|---|---|
| 5,737,457 A | 4/1998 | Saini et al. | |
| 6,519,382 B1 * | 2/2003 | Jurbergs et al. | 385/18 |
| 6,888,981 B2 | 5/2005 | Blake et al. | |
| 7,106,921 B2 | 9/2006 | Iwamori et al. | |
| 8,542,961 B2 * | 9/2013 | Kuo et al. | 385/32 |
| 2004/0156134 A1 | 8/2004 | Furuki | |

FOREIGN PATENT DOCUMENTS

| | | |
|---|---|---|
| GB | 2189046 | 10/1987 |
| JP | 1986-094006 | 5/1986 |
| JP | 1987-175704 | 8/1987 |

* cited by examiner

OPTICAL BEAM COUPLERS AND SPLITTERS

CROSS-REFERENCE TO RELATED APPLICATION

This application is a divisional of U.S. application Ser. No. 13/126,845, filed Apr. 29, 2011, now U.S. Pat. No. 8,542,961, which is incorporated herein by reference in its entirety.

BACKGROUND

The present disclosure relates generally to optical beam couplers and splitters.

Since the inception of microelectronics, a consistent trend has been toward the development of optoelectronic circuits, such as optical interconnects. This may be due, at least in part, to the fact that optoelectronic circuits may offer advantages over typical electronic circuits, such as, for example, a much larger bandwidth (by many orders of magnitude). Such optoelectronic circuits often involve the transmission of optical signals, and the interconversion of such optical signals into electronic signals. In some instances, performing optical signal transmission involves a waveguide. Optical wave guides are commonly made with glass or polymers. Extraction of a fraction of the guided signal with these solid wave guides typically requires complicated tapping structures. Some optical waveguides are hollow metal structures. Optical signals propagate in air through such structures, and, as such, stringent alignment and collimation are required for proper signal transmission.

BRIEF DESCRIPTION OF THE DRAWINGS

Features and advantages of embodiments of the present disclosure will become apparent by reference to the following detailed description and drawings, in which like reference numerals correspond to the same or similar, though perhaps not identical, components. For the sake of brevity, reference numerals having a previously described function may or may not be described in connection with subsequent drawings in which they appear.

FIGS. 2A, 2B and 2D together depict a schematic flow diagram of another embodiment of the method for forming another embodiment of the beam coupler and splitter;

FIGS. 2A, 2B and 2E together depict a schematic flow diagram of another embodiment of the method for forming still another embodiment of the beam coupler and splitter;

FIGS. 2A, 2B and 2F together depict a schematic flow diagram of another embodiment of the method for forming yet another embodiment of the beam coupler and splitter;

DETAILED DESCRIPTION

Embodiments of the beam coupler and splitter disclosed herein include various waveguides which are configured to enable flexible topographical arrangements for the layout and routing of signal paths. The coupling ratio of the beam coupler and splitter may advantageously be adjusted dynamically (e.g., out in the field) or set to a predetermined fixed ratio. In the embodiments disclosed herein, the coupling ratio is independent of the polarization of the optical signal, and in some instances, coupling/splitting results without significant attenuation of the optical signal.

Figure 1:
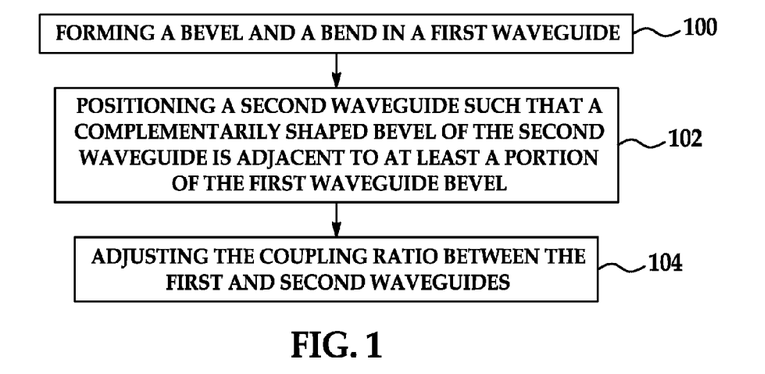
FIG. 1 is a flow diagram depicting an embodiment of a method for forming an embodiment of a beam coupler and splitter.

Referring now to FIG. 1, an embodiment of the method for forming an embodiment of the beam coupler and splitter disclosed herein is depicted. Generally, the method includes forming a bevel and a bend in a first waveguide, as shown at reference numeral 100; positioning a second waveguide such that a complementarily shaped bevel of the second waveguide is adjacent to at least a portion of the first waveguide bevel, as shown at reference numeral 102; and adjusting the coupling ratio between the first and second waveguides, as shown at reference numeral 104. It is to be understood that this method will be discussed further hereinbelow in reference to FIGS. 2A through 2G, 3A and 3B, and 4-10. FIG. 11 depicts another embodiment of a beam coupler and splitter, and the method of forming such embodiment will be discussed in reference to FIG. 11.

Figure 2A:
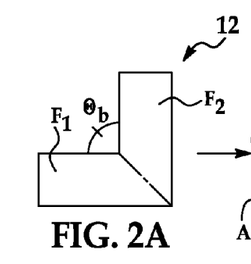
FIGS. 2A through 2C together depict a schematic flow diagram of an embodiment of the method for forming an embodiment of the beam coupler and splitter.
Figure 2B:
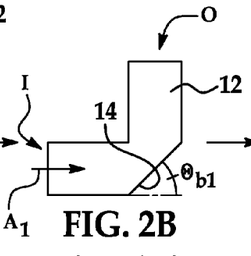

FIGS. 2A and 2B generally depict the formation of the first waveguide 12 with a bend and a bevel 14. The bend is generally opposed to the bevel 14, and the bevel 14 is symmetrical to the input port I and output port O sections of the waveguide 12. The bevel 14 is configured to totally internally reflect light incident thereon, so that light from the input port I is redirected toward the output port O (except at areas where the device is otherwise configured to transmit light through the bevel 14, as discussed in various embodiments hereinbelow). When the first waveguide 12 is linear, it is to be understood that a bend may be formed by coupling another waveguide that provides a path for light incident on and reflected off of the bevel 14 (see, for example, FIG. 9B).

As shown in FIG. 2A, the first waveguide 12 may be formed by adhering two fibers $F_1$, $F_2$ together. Generally, the fibers $F_1$, $F_2$ are formed of the same material having a desirable refractive index, and are adhered together via an index matching adhesive (e.g., glue). In a non-limiting example, the fibers $F_1$, $F_2$ forming waveguide 12 are glass, polymeric material(s) (e.g., polycarbonate, polyamide, acrylics, etc.), silicon, or another like material. The diameter of each of the fibers $F_1$, $F_2$ ranges from about 20 microns to about 1000 microns. In one embodiment, the fibers $F_1$, $F_2$ may be adhered so that the waveguide 12 exhibits the desirable bend. In another embodiment, a single fiber may be physically bent to a desirable radius of curvature. It is to be understood that the bend may be at any desirable angle $\theta_b$ (as shown in FIG. 2A) or at any desirable radius of curvature, each of which depends, at least in part, on the desirable path for the light beams. The bend in FIG. 2A is shown at 90° and a radius of curvature of 0. In other embodiments, the radius of curvature is larger than zero, and the bending is gradual and continuous (see, for example, FIGS. 4B and 5B, as opposed to the abrupt angle $\theta_b$ shown in FIG. 2A).

Once the fibers $F_1$, $F_2$ are adhered in a desirable manner, a bevel 14 is formed in the first waveguide 12. In a non-limiting example, the bevel 14 is cut and polished. In another non-limiting example, a mold having the desirable shape (e.g., that shown in FIG. 2B) may be used to form the bend and the bevel 14 of the waveguide 12. In still other techniques, lithography is used to form the waveguide 12. The surface of the bevel 14 may be flat or curved. As previously mentioned, light incident on at least some of the bevel 14 undergoes total internal reflection; as such, at least one portion of the bevel 14 is configured at an angle $\theta_{b1}$ (with respect to the axis $A_1$) that is less than 90°-critical angle (which is defined by $\arcsin^*(n_2/n_1)$, wherein $n_2$ is the refractive index of the less dense medium (e.g., air reflective coating) and $n_1$ is the refractive index of the denser medium (e.g., the waveguide 12)). For typical waveguide 12 materials (see above), the angle $\theta_{b1}$ is 45° or less. As shown in FIG. 2B, the bevel 14 is at a 45° angle.

As shown in FIGS. 2C through 2F, the first waveguide 12 is coupled in some manner with a second waveguide 16. In all of the embodiments described in reference to FIGS. 2C through 2F, the second waveguide 16 includes a bevel 18 that is complementarily shaped to the first waveguide bevel 14, and the second waveguide bevel 18 is positioned adjacent to at least a portion of the first waveguide bevel 14. As shown in FIGS. 2C through 2F, the phrase "positioned adjacent to" includes one bevel 14 contacting the other bevel 18 directly or such that a material (e.g., a reflector, air, etc.) is positioned therebetween.

It is to be understood that all embodiments of the second waveguide 16 (including bevel 18) disclosed herein may be formed via the same method described hereinabove for forming all of the embodiments of the first waveguide 12 (including bevel 14) disclosed herein. As discussed further hereinbelow, any embodiment of the second waveguide 16 may be formed of the same or a different material than the first waveguide 12, and thus may have the same or a different refractive index than the first waveguide 12. Generally, the second waveguide 16 is formed of one or more fibers, depending, at least in part on the configuration of the waveguide 16. Still further, in some instances, the second waveguide 16 is a different shape than the first waveguide 12, and in other instances, the second waveguide 16 is symmetrical to the first waveguide 12.

In some instances, the first and/or second waveguides 12, 16 respectively may be composed of holey or microstructured fibers. Such holey fibers have a substantially regular arrangement of air holes extending along the length of the fiber to act as a cladding layer. The core is generally formed by a solid region in the center of the substantially regular arrangement of air holes, or by an additional air hole in the center of the substantially regular arrangement of air holes. The effective refractive index of such fibers is determined by the density of the holes. As such, the holes may be arranged to change the effective index of the waveguides 12 and/or 16. The core of holey fibers will generally have a lower density of holes than the cladding layer, and thus the effective index of the core is generally higher than that of the cladding.

In each of the embodiments, the ratio (i.e., coupling or splitting ratio, $R=r/t$) of reflected light r to transmitted light t may be varied depending upon the coupling technique utilized to couple the waveguides 12, 16. It is to be understood that adjusting the ratio may be performed dynamically (e.g., in the field), or may be accomplished such that the beam coupler and splitter is manufactured with a fixed coupling ratio. In the Figures, "i" represents the light beams input into the waveguide 12.

In the embodiments disclosed herein, the refractive indices of the waveguides 12, 16 are the same or about the same. The indices of the waveguides 12, 16 should be within the range of $\sin(90-\theta_{b1}) < n_2/n_1$. In such instances, each of the waveguides 12, 16 may be selected from glass, polymeric material(s) (e.g., polycarbonate, polyamide, acrylics, etc.), silicon, or another like material. In order to achieve the desirable coupling ratio when the materials of the waveguides 12, 16 are the same, many different techniques may be utilized. Such techniques are described in reference to FIGS. 2C-2F and FIGS. 3A and 3B.

Figure 2C:
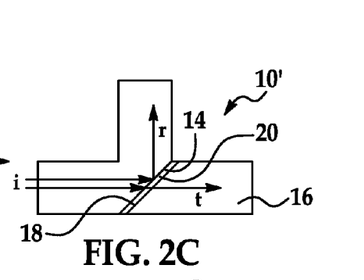

In FIG. 2C, the coupling ratio of the beam coupler and splitter 10' is adjusted by establishing an at least partially reflective coating 20 between the bevels 14, 18. The percentage of reflectivity and the pattern in which the at least partially reflective coating 20 is established depend, at least in part, on the desirable beam splitting properties at the interface between the bevels 14, 18. In some instances, the coating 20 is partially reflective (i.e., less than 100% reflective) and is established on the entire interface between the bevels 14, 18. In other instances, the coating 20 is 100% reflective, and is established on portions of the interface between the bevels 14, 18 (e.g., in a dotted, striped or other like pattern). In still other instances, some portions of the coating 20 are 100% reflective, while other portions of the coating 20 are less than 100% reflective. Light beams contacting the reflective portions of the coating 20 will be redirected (e.g., into the upper portion of the first waveguide 12), while light beams contacting the less or non-reflective portions of the coating 20, or those areas between the bevels 14, 18 not including the coating 20, will continue to pass through to the waveguide 16.

As a non-limiting example, if it is desirable to have 75% of the light beams transmitted through to the second waveguide 16 and 25% of the light beams reflected into the upper portion of the first waveguide 12, than a 100% reflective coating 20 may be established on 25% of one of the bevels 14, 18 before the bevels 14, 18 are adhered together.

Non-limiting examples of suitable materials for the at least partially reflective coating 20 include silver, aluminum, or another material that is a reflector of the selected wavelength of light. The at least partially reflective coating 20 may be established on either or both of the bevel surfaces prior to adhering the bevels 14, 18 together. Non-limiting examples of suitable techniques for establishing the coating 20 are thermal or e-beam evaporation, sputtering or CVD/PVD growth.

It is to be further understood that the thickness of the at least partially reflective coating 20 may also be changed to adjust the coupling ratio. The percentage of reflection is determined by the thickness of the coating 20. For example, a 0.01 μm thick coating of aluminum would be partially reflective, while a 1 μm thick coating of aluminum would be 100% reflective. As such, the desired coupling ratio may be controlled by the thickness of the coating 20. In some instances, multiple layers of materials having different indices of refraction may also be used to achieve partial reflection. The reflection of such a multi-layer coating would be polarization dependent, and thus may be less desirable.

Figures 2D, 2E, 2F:
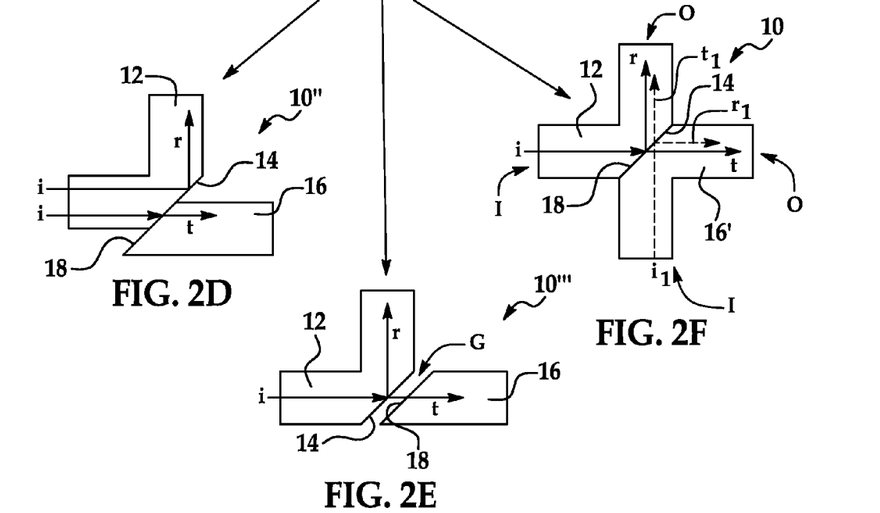

Referring now to FIG. 2D, in this embodiment of the beam coupler and splitter 10", the coupling ratio is adjustable by offsetting the second waveguide bevel 18 from the first waveguide bevel 14. As depicted, light beams that are incident on the bevel 14 that is not adjacent to waveguide 16 experience total internal reflection and are rerouted within the waveguide 12. In this embodiment, since the waveguides 12, 16 have the same refractive index, those light beams incident on the interface at which the bevels 14, 18 are in direct contact are transmitted through to the waveguide 16. As the offset increases, the ratio of reflected light to transmitted light increases.

FIG. 2E depicts still another embodiment of how the coupling ratio of the beam coupler and splitter 10''' may be adjusted. In this embodiment, a gap G is formed between the bevels 12, 16. When the gap G thickness is less than 1 wavelength, the light beams will be transmitted. In some instances, the gap G is constant throughout the interface between bevels 12, 16. In other instances, the gap G may have varying thicknesses along the length of the bevels 12, 16 so that a desirable percentage of the light beams is reflected and transmitted. It is to be understood that when the gap G is larger than about 1 wavelength, the first waveguide bevel 14 is adjacent to air. In such an example, total internal reflection occurs at the bevel 14, and thus there is no coupling between the waveguides 12, 16.

The embodiments of FIGS. 2C through 2E illustrate a substantially linear second waveguide 16. FIG. 2F illustrates another example of the second waveguide 16'. As depicted, this embodiment of the second waveguide 16' includes a bend, and is symmetrical to the first waveguide 12. It is to be understood that the shapes, bends, and/or angles of the waveguides 12, 16' in this Figure are illustrative and not limiting. Furthermore, since the materials for the waveguides 12, 16, 16' are relatively flexible, the waveguides 12, 16, 16' may be configured with other shapes (e.g., including curves, see FIG. 10).

The configuration of the beam coupler and splitter 10 of FIG. 2F may be used to couple and split light in various ways. Light beams (labeled i and $i_1$) may be input via either one of the input ports I or via both of the input ports I of the waveguides 12, 16'. When both input ports I are utilized, different information/signal/modulation may be encoded in the respective light beam(s) entering input ports I of waveguides 12, 16'. The signals are combined by the splitter/combiner/coupler 10 in FIG. 2F and are routed to different destinations through the output ports O of the waveguides 12, 16'. The light entering the input ports I may be time multiplexed or of different wavelengths to allow separation of the combined signals at the output ports O. It is to be understood that the input ports I and output ports O of the embodiment shown in FIG. 2F may be reversed, thereby reversing the path of the light beams through the beam coupler and splitter 10. It is to be further understood that any one or more of the techniques for adjusting the coupling ratio described in conjunction with FIGS. 2C-2E may be implemented in the embodiment shown in FIG. 2F.

Figure 3A:
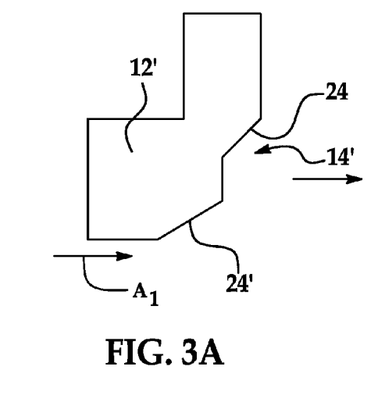
FIGS. 3A and 3B together depict a schematic flow diagram of an embodiment of the method for forming another embodiment of the beam coupler and splitter including compound bevels.
Figure 3B:
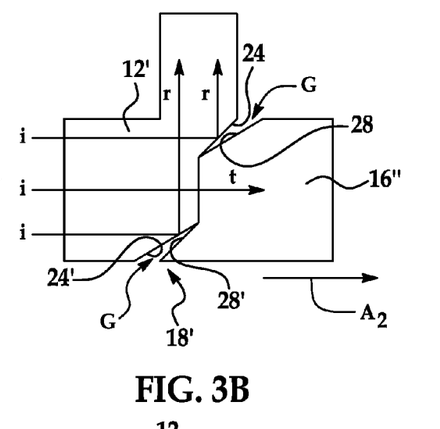

Referring now to FIGS. 3A and 3B, other embodiments of the waveguide 12', 16" are depicted. The embodiments shown in FIGS. 2A-2F illustrate single bevels 14, 18, while the embodiments shown in FIGS. 3A-3B illustrate compound bevels 14', 18'. Generally, the adherence of the compound bevels 14', 18' (shown in FIG. 3B) results in the formation of gaps G that are large (e.g., greater than 1 wavelength) and constant such that light incident on the sub-bevels 24, 24' adjacent to the gaps G is totally internally reflected into waveguide 12'. However, light that is incident on the contact surfaces is 100% transmitted through the waveguides 12', 16". The ratio of the contacting area and the gap G area (and thus the coupling ratio) is controlled by the asymmetry of the waveguides 12', 16". The compound bevel 14' of the first waveguide 12" includes sub-bevels 24, 24'. Similarly, the compound bevel 18' of the second waveguide 16" includes sub-bevels 28, 28'. The sub-bevels 24, 24' and 28, 28', of each waveguide 12', 16" are separated via a contact surface that is perpendicular to an axis $A_1, A_2$ of the respective waveguides 12', 16". The dimensions of the first waveguide sub-bevel 24 correspond with the dimensions of the second waveguide sub-bevel 28', and dimensions of the first waveguide sub-bevel 24' correspond with the dimensions of the second waveguide sub-bevel 28. When the contact surfaces of the bevels 12', 16" are in direct contact, these dimensions form the gaps G between sub-bevels 24 and 28 and 24' and 28'. In this non-limiting example, the gaps G are formed without offset of the compound bevels 14', 18'.

It is to be understood that any of the coupling ratio adjustment techniques disclosed herein may be incorporated together in the same beam coupler and splitter.

Figure 4A:
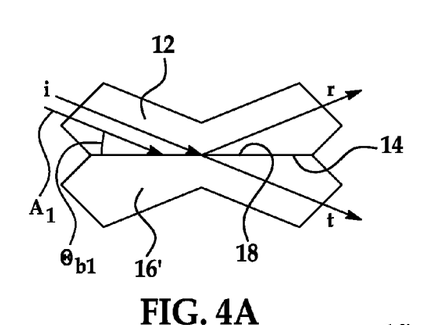
FIG. 4A is a schematic diagram of another embodiment of the beam coupler and splitter shown in FIG. 2F with an angled bend.
Figure 4B:
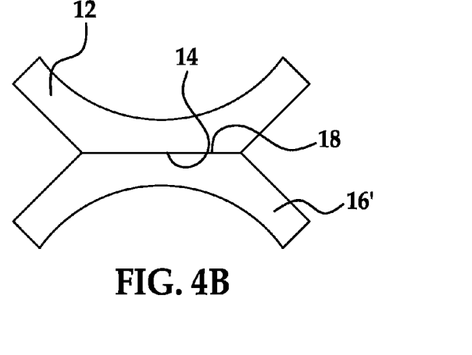
FIG. 4B is a schematic diagram of still another embodiment of the beam coupler and splitter shown in FIG. 2F with a curved bend.
Figure 5A:
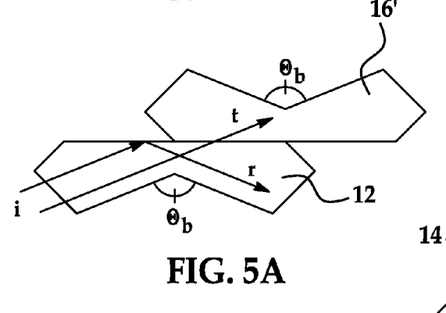
FIG. 5A is a schematic diagram of another embodiment of the beam coupler and splitter shown in FIG. 2D with an angled bend.
Figure 5B:
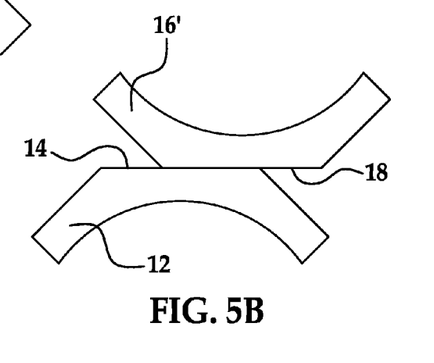
FIG. 5B is a schematic diagram of another embodiment of the beam coupler and splitter shown in FIG. 2D with a curved bend.

Referring now to FIGS. 4A and 5A, still other examples of the beam coupler and splitters of FIGS. 2F and 2D are shown. The examples in FIGS. 4A and 5A illustrate that the waveguides 12, 16, 16' may be configured with bend angles $\theta_b$ other than 90°, and that the bevels 14, 18 may be configured at angles $\theta_{b1}$ other than 45°. It is believed that smaller bevel 14, 18 angles $\theta_{b1}$ enable the beam coupler and splitter 10, 10', 10", 10''' to be used in situations where the difference in the index of refraction between the waveguides 12, 16, 16' and the surrounding material (e.g., clad) is small. A larger radius of curvature also enables different physical configurations to be obtained. As shown in FIGS. 4B and 5B, the bends of the waveguides 12, 16, 16' may be continuous and curved instead of abrupt (as shown in FIGS. 4A and 5A).

Figure 6:
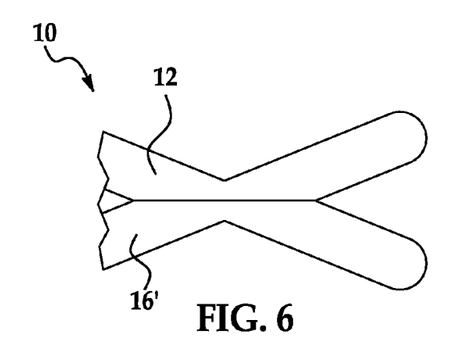
FIG. 6 is a schematic cutaway view of an embodiment of a symmetrical beam coupler and splitter, in which ends of the waveguides are rounded.

FIG. 6 is an example of still another embodiment of the beam coupler and splitter 10. In this embodiment, the ends of the fibers forming the waveguides 12, 16' are rounded via a reflow technique, heating technique, or other suitable technique. The rounded ends form self-aligned lenses to couple light beams in and/or out of the beam coupler and splitter 10. It is to be understood that rounded ends may be included on any of the embodiments disclosed herein.

Figure 7:
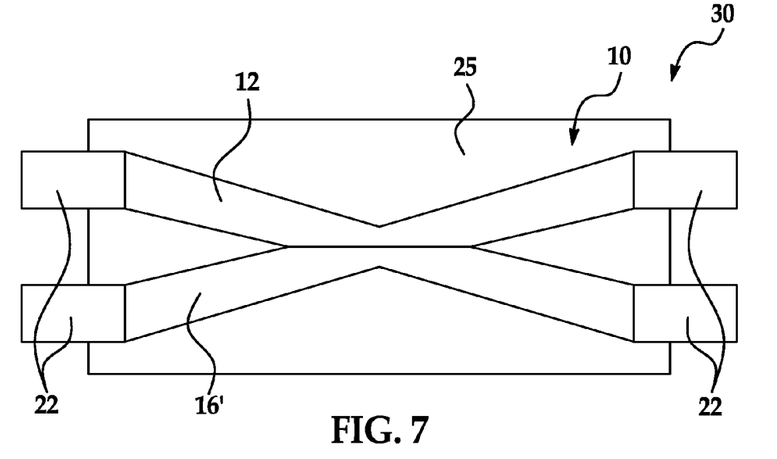
FIG. 7 is a schematic diagram of an embodiment of a symmetrical module including an embodiment of the beam coupler and splitter similar to that shown in FIG. 4.

FIG. 7 illustrates a non-limiting example of a symmetrical module 30 including the embodiment of the beam coupler and splitter 10 shown in FIG. 4. In this module 30, the length of the waveguides 12, 16' is increased, and connectors 22 are operatively connected to the ends of the waveguides 12, 16'. It is to be understood that the connectors 22 are generally used to connect the waveguides 12, 16' to other waveguides 12, 12', 16, 16', 16" to create a network. A connector 22 is a physical assembly that allows the ends of the fibers 12, 16' to be accurately positioned. Such connectors 22 may be particularly desirable for embodiments in which multiple waveguides (with multiple input ports/output ports) are aligned (see FIG. 10). The connectors 22 may also include physical guides to allow coupling with a matching fiber ribbon. Some connectors 22 include lenses which focus light beams between adjacent waveguides.

In the embodiment shown in FIG. 7, the input and output of the light beams may be inverted, as desired. FIG. 7 also depicts a mechanical enclosure 25 surrounding the beam coupler and splitter 10. As a non-limiting example, such an enclosure 25 may be a box with air therein.

In any of the embodiments disclosed herein, a clad material (not shown) may be over the exterior surface of the optical fibers (i.e., waveguides 12, 16') of the beam coupler and splitter 10. Generally, the clad material is removed at the region where the bevels 14, 18 are formed to facilitate the splitting of the beam. Such a clad material generally has an index of refraction that is lower than the index of refraction of the waveguides 12, 16'. Non-limiting examples of suitable clad materials include fluorocarbon resins (such as TEFLON® from Dupont), silicon, insulating materials, or the like. The clad material may be deposited via chemical vapor deposition (CVD), ion implementation of a dopant, dipping, or other like processes. The cladding materials may also be spun on, cured, and hardened when the temperature reaches the glass transition temperature.

Figure 8:
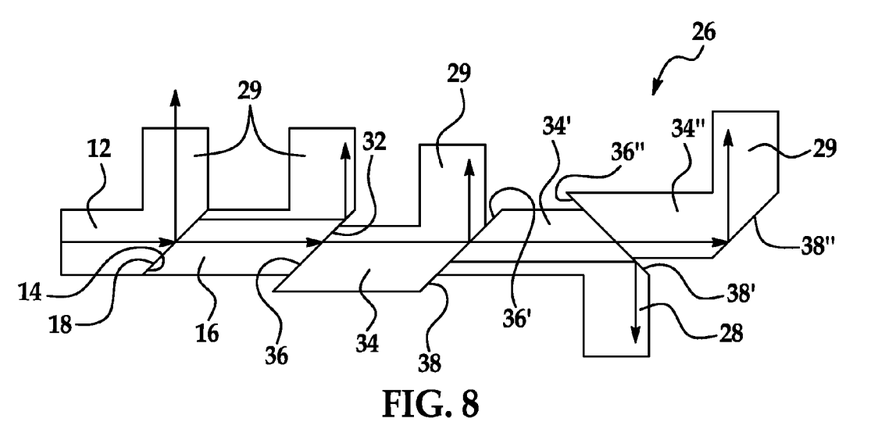
FIG. 8 is a schematic diagram depicting an embodiment of a plurality of waveguides cascaded together.

Referring now to FIG. 8, a plurality of waveguides 12, 16, 34 are coupled together to form a bus 26 (through which transmitted light beams travel) with multiple taps 29 (through which reflected light beams travel). First and second waveguides 12, 16 are coupled together via one of the methods disclosed hereinabove. In this embodiment, the second waveguide 16 is configured with a second bevel 32 that couples with an additional (e.g., third) waveguide 34 having a complementarily shaped bevel 36. The additional waveguide 34 is also configured with a second bevel 38 that is coupled to a complementarily shaped bevel 36' of still another (e.g., fourth) waveguide 34'. In this particular non-limiting example, a fifth waveguide 34" includes a bevel 36" that is complementarily shaped to a second bevel 38' of the fourth waveguide 34'. While five waveguides 12, 16, 34, 34', 34" are shown in FIG. 8, it is to be understood that any number of waveguides may be coupled together to achieve desirable light paths.

Also as shown in FIG. 8, each of the additional waveguides 34, 34', 34" is offset from a directly adjacent waveguide. Such offsets alter the coupling ratios of the adjacent waveguides, as described hereinabove. It is to be understood that any of the other methods disclosed hereinabove may be utilized to alter the respective coupling ratios.

In one embodiment, the waveguides 12, 16, 34, 34', 34" are formed of the same material and thus have the same index of refraction. In this embodiment, an at least partially reflective coating 20 (not shown in this Figure) formed via the techniques described hereinabove may be established between bevels that are not offset or separated via a gap G. It is to be understood, however, that the waveguides 12, 16, 34, 34', 34" may have their respective coupling ratios altered via any of the other techniques described herein (or via a combination of such techniques).

Figure 9A:
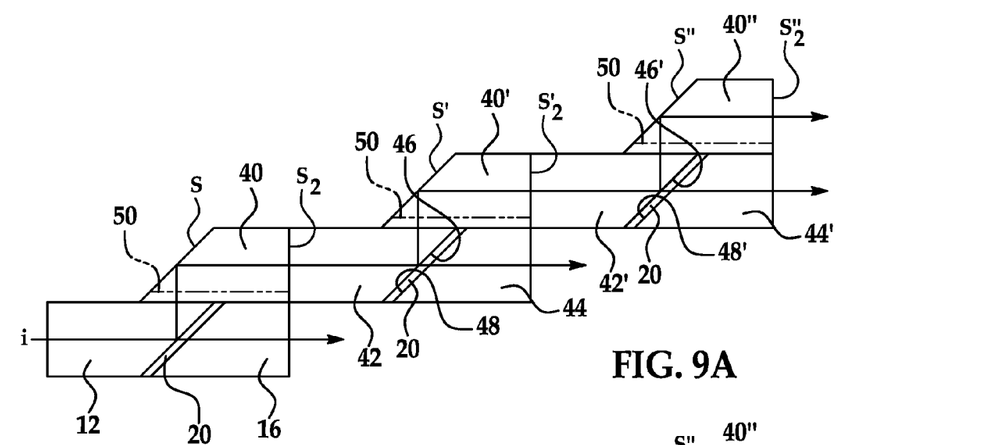
FIG. 9A is a schematic diagram depicting another embodiment of a plurality of waveguides cascaded together.

FIG. 9A illustrates yet another embodiment of a plurality of waveguides 12, 16 cascaded together. In this embodiment, an additional waveguide 40 is established on at least a portion of the first and second waveguides 12, 16. The additional waveguide 40 creates a bend for the first waveguide 12, such that light totally internally reflected therein is transmitted to the waveguide 40. The additional waveguide 40 may be adhered to the waveguides 12, 16 via an index matching adhesive material (e.g., glue) when the waveguides 12, 16, 40 have the same refractive index.

In this embodiment, the bevels 14, 18 have the at least partially reflective coating formed via the techniques described hereinabove established thereon in order to split the light beams per a desirable coupling ratio. It is to be understood, however, that the coupling ratio may be achieved via the other methods disclosed herein (e.g., offset, formation of gap G, compound bevel 14', 18', combinations thereof, etc.).

Light beams that are reflected off of the at least partially reflective coating 20 are directed toward the surface S that is configured to totally internally reflect any light beams incident thereon. The internally reflected light beams are redirected 90° such that they travel out of the additional waveguide 40.

As shown in FIG. 9A, the other surface $S_2$ of the additional waveguide 40 may be adhered to yet another waveguide 42 to further direct the light beams in a desirable manner. Generally, the surface $S_2$ and the complementarily shaped surface of the waveguide 42 are configured so that light is transmitted therethrough. The waveguide 42 has a bevel 46 that is complementarily shaped to a bevel 48 of a waveguide 44 adhered thereto. In this non-limiting example, the bevels 46, 48 have the at least partially reflective coating 20 established therebetween in order to split the light beams according to a predetermined coupling ratio. Another additional waveguide 40' is established on at least a portion of the waveguides 46, 48. This additional waveguide 40' may be adhered to the waveguides 46, 48 via an index matching adhesive material (e.g., glue), as generally the waveguides 46, 48, 40' have the same refractive index.

Light beams that are reflected off of the at least partially reflective coating 20 between the bevels 46, 48 are directed toward the surface S' that is configured to totally internally reflect any light beams incident thereon. The internally reflected light beams are redirected 90° such that they travel out of the additional waveguide 40'.

As shown in FIG. 9A, a similar stack of waveguides 42', 44' and 40" may be operatively coupled to the other waveguides 12, 16, 40, 42, 44, 40' by adhering the surface $S_2$' of waveguide 40' to a complementarily shaped surface of the waveguide 42'. The remainder of the waveguides 44', 40" may be configured and positioned as previously described for waveguides 16, 40, 44, 40'. Such stacks may be repeated as many times as is suitable to achieve desirable light paths.

As shown in phantom, a cladding layer 50 may also be established between the additional waveguides 40, 40', 40" and the waveguides 12, 16, 42, 44, 42', 44' upon which they are established. The reflected light beams are able to travel through such cladding layers 50. In some instances, the cladding layer 50 is established between the waveguides 16, 40, 44, 40', and 44', 40".

As previously mentioned, while the at least partially reflective coating 20 is shown in FIG. 9A (and in FIG. 9B discussed hereinbelow), it is to be understood that the coupling ratio between adjacent waveguides 12, 16, 42, 44, 42', 44' may be achieved via the other methods disclosed herein (e.g., offset, formation of gap G, compound bevel 14', 18', combinations thereof, etc.).

Figure 9B:
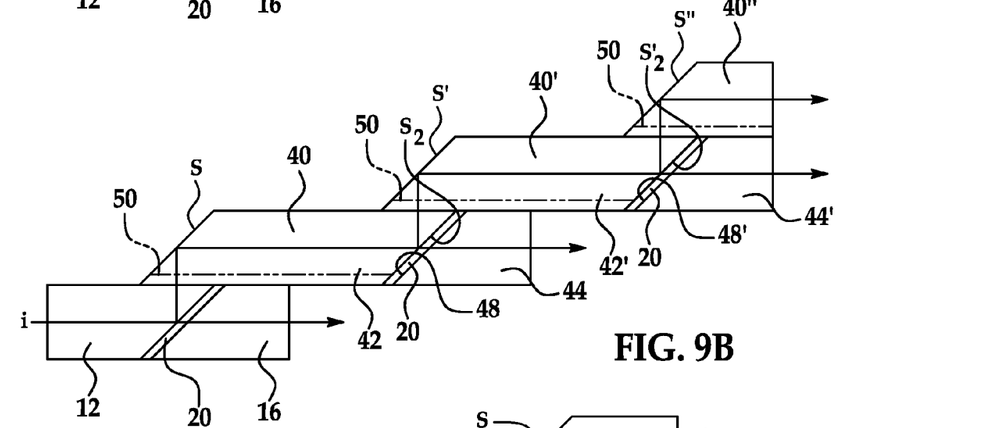
FIG. 9B is a schematic diagram depicting still another embodiment of a plurality of waveguides cascaded together.

FIG. 9B illustrates a similar embodiment of that shown in FIG. 9A, except that the waveguides 40 and 40' include a bevel at their respective second surfaces $S_2$, $S_2$' that is complementarily shaped to the bevels 48, 48' of the adjacent waveguides 44, 44'. In this embodiment, waveguides 42, 42' are not included.

Figure 9C:
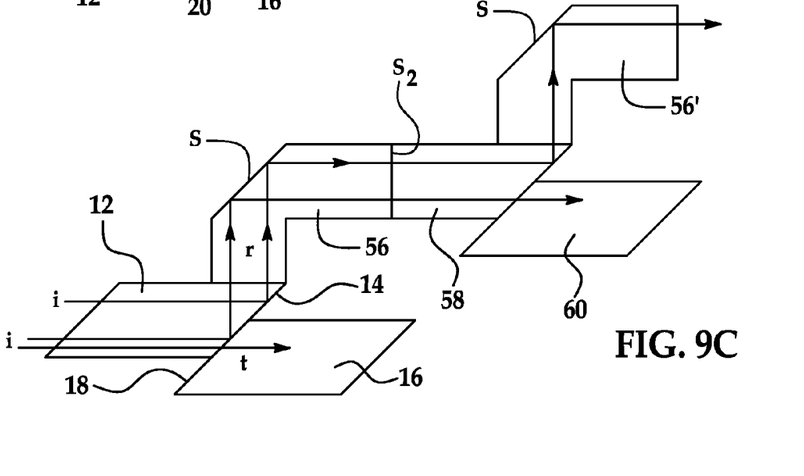
FIG. 9C is a schematic diagram depicting yet another embodiment of a plurality of waveguides cascaded together.

FIG. 9C illustrates still another embodiment of a plurality of waveguides 12, 16, 56, 56', 58, 60 cascaded together. In this embodiment, waveguides 12, 16 are coupled in an offset manner, such as that described hereinabove in reference to FIG. 2D. A third waveguide 56 is positioned on the waveguide 12 (thereby forming a bend for light totally internally reflected from waveguide 12). The waveguide 56 itself includes a bend and a surface S (i.e., a bevel) that totally internally reflects the light beams incident thereon. This waveguide 56 may be formed via the method described hereinabove for the waveguide 12.

As depicted, the waveguide 56 may include a second surface $S_2$ that is coupled to yet another waveguide 58. While not shown, it is to be understood that the second surface $S_2$ may also be a bevel, if it is so desired. Additional waveguides, for example, waveguides 60, 56', may be coupled in a suitable manner to achieve the desirable path for the light beams.

In this embodiment, the waveguides 12, 16, 58, 60 are shown as being offset to achieve the desirable coupling ratio, however, it is to be understood that the coupling ratio between adjacent waveguides 12, 16, 58, 60 may be achieved via the other methods disclosed herein (e.g., at least partially reflective coating 20, formation of gap G, compound bevel 14', 18', combinations thereof, etc.).

Figure 10:
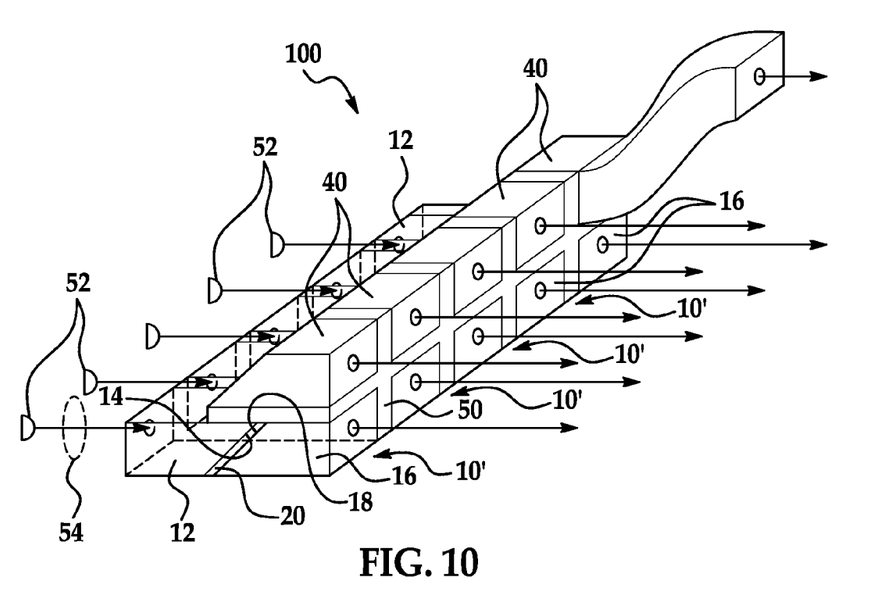
FIG. 10 is a schematic diagram of a system including a plurality of beam couplers and splitters separated via cladding layers.
Figure 11:
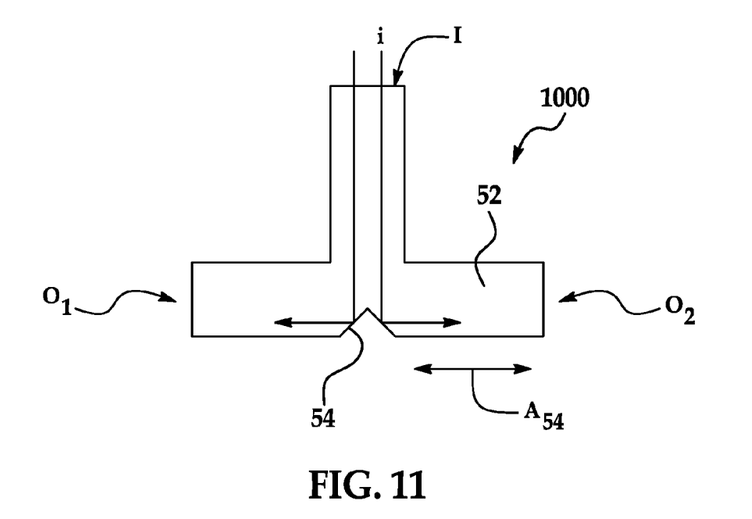
FIG. 11 is another embodiment of a beam coupler and splitter.

Referring now to FIG. 10, a non-limiting example of a system 100 including a plurality of beam couplers and splitters 10' is depicted. The beam couplers/splitters 10' form multiple parallel light channels. Each channel of this system 100 includes the first and second waveguides 12, 16 having the at least partially reflective coating 20 between the complementary bevels 14, 18, and the additional waveguide 40 positioned to redirect light beams traveling from the bevels 14, 18. While the reflective coating 20 is shown in this embodiment to achieve the desirable coupling ratio, it is to be understood that any of the other adjustments disclosed herein may be made to obtain the desirable coupling ratio.

Each channel of the system 100 is separated from an adjacent component 10 or channel via a cladding layer 50. The cladding layer 50 assists in reducing or eliminating optical crosstalk between the components 10'. The cladding layer 50 is generally formed of a material having a lower refractive index than the refractive index of the waveguides 12, 16. As previously mentioned, non-limiting examples of suitable cladding layer materials include fluorocarbon resins (such as TEFLON® from Dupont), silicon, insulating materials, or the like. This cladding layer 50 may be deposited via chemical vapor deposition (CVD), ion implementation of a dopant, dipping, or other like processes. The cladding materials may also be spun on, cured, and hardened when the temperature reaches the glass transition temperature.

It is to be understood that each of the couplers/splitters 10' in the system 100 has a light source 52 directing light beams to the respective waveguides 12. A non-limiting example of such a light source is a vertical-cavity surface-emitting laser (VCSEL). An individual lens 54 (shown in phantom) may also be utilized to direct the light beams from one light source 52 to the corresponding waveguide 12. The arrows shown in FIG. 10 illustrate how the light is guided through each of the beam couplers/splitters 10'. As depicted, the light of the system 100 is coupled in a parallel manner utilizing the components 10'.

Also shown in FIG. 10 is a non-limiting example of how the waveguides (in this example, one of the additional waveguides 40) may be configured to have a curved shape. It is believed that since relatively flexible materials (e.g., polymers) may be used to form the waveguides, such alternate shapes may be readily achieved. Such waveguides function similarly to ribbon cables for the transmission of electrical signals.

While not shown in the Figures, one or more detectors may be positioned to detect some or all of the light beams exiting the beam couplers and splitters.

Referring now to FIG. 11, another embodiment of the beam coupler/splitter 1000 is depicted. This embodiment of the beam coupler/splitter 1000 includes a T-shaped waveguide 52 having a single input port I and two output ports $O_1$, $O_2$. The materials described hereinabove for the other waveguides 12, 16, etc. may be used to form T-shaped waveguide 52. As one non-limiting example, a first fiber may be adhered to a second fiber to form the T-shaped waveguide 52. As another non-limiting example, a single fiber may form the T-shaped waveguide 52.

A wedge 54 is formed in the T-shaped waveguide 52 at a position such that the wedge 54 splits light beams entering the T-shaped waveguide 52 via the single input port I in a predetermined manner between the two output ports $O_1$, $O_2$. Moving the wedge 54 along the axis $A_{54}$ will vary the ratio of light beams reflected to the first output $O_1$ to light beams reflected to the second output $O_2$. As an example, if the wedge 54 shown in FIG. 11 is moved along the axis $A_{54}$ toward the output $O_1$ (but still opposed to the input port I), more light would be directed toward the output $O_2$.

The angles of the wedge 54 are configured such that total internal reflection occurs. The wedge 54 may be formed in the waveguide 52 via, e.g., molding or lithography techniques.

The beam coupler and splitters 10, 10', 10'', 10''', 1000 disclosed herein may be configured to guide any desirable wavelengths. As such, the terms "light" and "light beams" used herein, are broadly defined to include wavelengths ranging from about 400 nm to about 1500 nm. In some instances, the light refers to electromagnetic radiation with a wavelength near the visible range (400 nm-700 nm). In other instances, the light refers to wavelengths of 850 nm. In still other instances, the light refers to the wavelength commonly used for telecommunications, or 1500 nm.

While several embodiments have been described in detail, it will be apparent to those skilled in the art that the disclosed embodiments may be modified. Therefore, the foregoing description is to be considered exemplary rather than limiting.

What is claimed is:

1. A beam coupler and splitter, comprising:
a first waveguide including a first waveguide bevel and a bend, the first waveguide bevel to totally internally reflect at least some light incident thereon; and
a second waveguide including a second waveguide bevel complementarily shaped to the first waveguide bevel, the second waveguide being coupled to the first waveguide such that i) the first waveguide bevel is offset from the second waveguide bevel so that a first portion of the first waveguide bevel is in direct contact with a first portion of the second waveguide bevel, a second portion of the first waveguide bevel is exposed, and a second portion of the second waveguide bevel is exposed, and ii) a predetermined coupling ratio is achieved.

2. The beam coupler and splitter as defined in claim 1 wherein the second waveguide includes an other bevel, and wherein the beam coupler and splitter further comprises a third waveguide including a third waveguide bevel complementarily shaped to the other second waveguide bevel, the third waveguide being coupled to the second waveguide such that i) the third waveguide bevel is adjacent to at least a portion of the other second waveguide bevel, and ii) an other predetermined coupling ratio is achieved.

3. The beam coupler and splitter as defined in claim 1, further comprising a third waveguide established on the first waveguide, the third waveguide forming the bend of the first waveguide and including an angled surface that is to totally internally reflect a light beam from the second portion of the first waveguide bevel and incident on the angled surface.

4. The beam coupler and splitter as defined in claim 1 wherein the bend is positioned at a predetermined angle or radius of curvature.

5. A method for forming the beam coupler and splitter of claim 1, the method comprising:
- forming the first waveguide bevel and the bend in the first waveguide; and
- positioning the second waveguide such that the complementarily shaped second waveguide bevel of the second waveguide is offset from the first waveguide bevel so that:
  - the first portion of the first waveguide bevel is in direct contact with the first portion of the second waveguide bevel;
  - the second portion of the first waveguide bevel is exposed; and
  - the second portion of the second waveguide bevel is exposed, thereby adjusting the coupling ratio between the first and second waveguides.

6. A system for coupling and splitting light beams, comprising:
- the beam coupler and splitter as defined in claim 1; and
- a light source positioned to direct light beams into the first waveguide of the beam coupler and splitter.

7. The system as defined in claim 6, further comprising:
- a second beam coupler and splitter;
- a second light source positioned to direct light beams into a first waveguide of the second beam coupler and splitter; and
- a cladding layer positioned between the beam coupler and splitter and the second beam coupler and splitter.

* * * * *